D. C. KNOWLES.
Kneading Roller.

No. 164,095.  Patented June 8, 1875.

Witnesses.
A. E. Denison
Saml. M. Barton

Inventor.
D. C. Knowles.
by his Attys.
Carroll D. Wright & Brown

UNITED STATES PATENT OFFICE.

DANIEL C. KNOWLES, OF LYNN, MASSACHUSETTS.

IMPROVEMENT IN KNEADING-ROLLERS.

Specification forming part of Letters Patent No. 164,095, dated June 8, 1875; application filed January 20, 1875.

*To all whom it may concern:*

Figure 1:
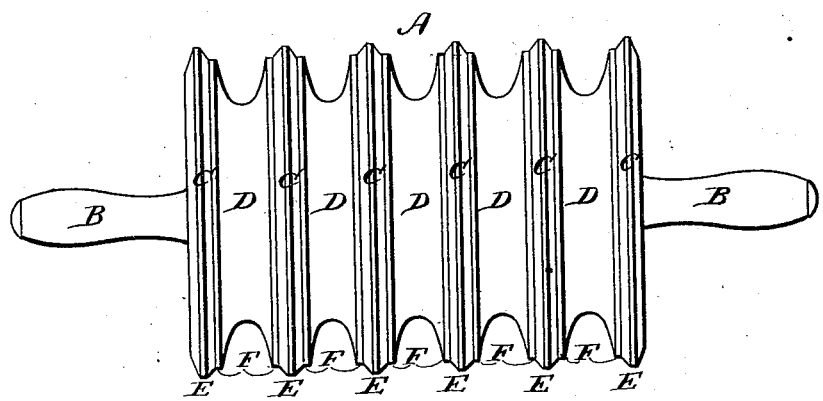
Figure 2:
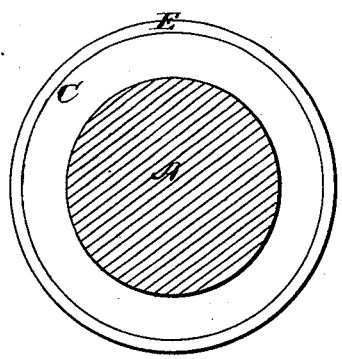

Be it known that I, DANIEL C. KNOWLES, of Lynn, in the county of Essex and State of Massachusetts, have invented certain Improvements in Kneading-Rollers, of which the following is a specification:

In the accompanying drawings, forming part of this specification, Figure 1 is a side elevation of my improved kneading-roller, and Fig. 2 a transverse section of the same.

This invention has for its object to provide a simple, economical, and effective device for kneading dough at a much less expense of time and labor than by the ordinary hand manipulation. To this end my invention consists of a roller adapted to be rotated by suitable end handles, and provided on its periphery with a series of concentric projections separated by interstices of suitable depth, each projection being formed with several angles or shoulders on its periphery, the roller, with its projections and interstices, operating on the dough when rolled over it in such manner as to thoroughly knead it, as I will now proceed to describe.

In the drawings, A represents a roller, having the usual end handles B. The roller is provided on its periphery with a series of concentric projections, C, separated from each other by interstices D of suitable depth. The projections C have beveled sides, and the periphery of each is formed with an outer projection, E, tapering to a narrow flat edge or outer periphery, and leaving on either side of its base narrow flat surfaces F.

By this means a diversified surface is produced, which thoroughly breaks up, distributes, and kneads the dough when rolled upon it after the ordinary method of operating a roller, the kneading being accomplished in a more thorough, easy, and expeditious manner than by the ordinary hand manipulation, as heretofore performed.

I claim as my invention—

As a new article of manufacture, a kneading-roller, A, having the concentric projections C, the latter having the diversified surfaces or peripheries E F, and being separated by the interstices D, substantially as described, for the purpose specified.

In testimony whereof I have signed my name to this specification in the presence of two subscribing witnesses.

DANIEL C. KNOWLES.

Witnesses:
SAML. M. BARTON,
C. F. BROWN.